United States Patent
Choe et al.

(10) Patent No.: US 8,378,039 B2
(45) Date of Patent: Feb. 19, 2013

(54) METHOD AND APPARATUS FOR MANUFACTURING POLYMER PARTICLE

(75) Inventors: Jae Hoon Choe, Daejeon (KR); Chang Houn Rhee, Daejeon (KR); Jung Hyun Seo, Daejeon (KR); Yoo Seok Kim, Daejeon (KR); In Hyoup Song, Goyang-si (KR); Jung Uk Choi, Daejeon (KR); Kwang Ho Song, Sungnam-si (KR)

(73) Assignee: LG Chem, Ltd., Seoul (KR)

( * ) Notice: Subject to any disclaimer, the term of this patent is extended or adjusted under 35 U.S.C. 154(b) by 76 days.

(21) Appl. No.: 13/127,012

(22) PCT Filed: Nov. 23, 2009

(86) PCT No.: PCT/KR2009/006881
§ 371 (c)(1),
(2), (4) Date: Jun. 24, 2011

(87) PCT Pub. No.: WO2010/059000
PCT Pub. Date: May 27, 2010

(65) Prior Publication Data
US 2011/0263800 A1    Oct. 27, 2011

(30) Foreign Application Priority Data
Nov. 21, 2008    (KR) .................. 10-2008-0116497

(51) Int. Cl.
*C08F 2/01* (2006.01)
*C08F 12/20* (2006.01)
*B01J 19/00* (2006.01)

(52) U.S. Cl. ........... 526/64; 526/242; 422/131; 422/134

(58) Field of Classification Search .............. 526/64, 526/242; 422/131, 134
See application file for complete search history.

(56) References Cited

U.S. PATENT DOCUMENTS

| | | | |
|---|---|---|---|
| 6,082,891 A | 7/2000 | Schubert et al. | |
| 6,399,031 B1 | 6/2002 | Herrmann et al. | |
| 6,555,629 B1 | 4/2003 | Pysall et al. | |
| 2004/0260026 A1 | 12/2004 | Enright et al. | |
| 2006/0089474 A1 | 4/2006 | Yamazaki et al. | |
| 2007/0032614 A1 | 2/2007 | Goossens et al. | |

FOREIGN PATENT DOCUMENTS

| | | | |
|---|---|---|---|
| EP | 1 829 920 A1 | 9/2007 | |
| JP | 2504452 | 4/1996 | |
| WO | WO 98/07764 A1 | 2/1998 | |
| WO | WO 2006/071515 A2 * | 7/2006 | |

* cited by examiner

*Primary Examiner* — William Cheung
(74) *Attorney, Agent, or Firm* — McKenna Long & Aldridge, LLP

(57) ABSTRACT

[Summary]
The present invention relates to an apparatus for manufacturing polymer particles and a method for manufacturing the same. The present invention provides an apparatus and a method, by which polymer particles having excellent monodispersity and homogeneous physical properties, such as homogeneous cross-linking degree and polymerization degree, may be efficiently prepared. In the present invention, particles having excellent monodispersity with the desired particle diameter, and also having a high cross-linking degree or a core-shell or core-double shell structure may also be effectively prepared. In addition, the processes for manufacturing said polymer particles are exceptionally reproducible in the present invention. Additionally, the present invention provides an apparatus which may effectively control particle diameter, shape, cross-linking degree, polymerization degree or structure, and the concentration of solid content in a polymer solution, and the like, depending on the intended purpose, and a method thereof.

16 Claims, 12 Drawing Sheets

METHOD AND APPARATUS FOR MANUFACTURING POLYMER PARTICLE

This application is a National Stage Entry of International Application No. PCT/KR2009/006881, filed Nov. 23, 2009, and claims the benefit of Korean Patent Application No. 10-2008-0116497, filed on Nov. 21, 2008, which is hereby incorporated by reference for all purposes as if fully set forth herein.

DETAILED DESCRIPTION OF INVENTION

1. Technical Field

The present invention relates to an apparatus for manufacturing polymer particles and a method for manufacturing the same.

2. Background Art

Polymer particles such as poly(methyl methacrylate) (PMMA) particles or polystyrene particles have been utilized in various fields such as flat panel displays (FPD), fillers for antiglare coatings, fillers for liquid chromatography (LC) columns, anisotropic conductive fillers (ACF), polymerized toners, e-papers and phase change materials (PCM).

At present, polymer particles are mainly prepared by a batch process, since it is impossible to continuously synthesize monodisperse polymer particles that have the desired size, cross-linking degree and/or structure.

For example, U.S. Pat. No. 5,863,996 discloses a batch process for preparing polymer particles. Such a batch process for preparing polymer particles requires various steps such as a step of feeding monomers or a reactant comprising monomers into a reactor; a step of carrying out polymerization; and then cooling the resultant polymer, followed by removing and washing steps to obtain the desired product. Therefore, in the batch process, it takes not only a long time to prepare polymer particles, but also the manufacturing cost is high.

Especially, in order for polymer particles to be effectively used in various fields, it is necessary for them to have excellent physical properties such as monodispersity. However, as polydisperse particles are produced in the conventional process, it is very difficult to homogeneously maintain the physical properties of the prepared particles.

Thus, in order to obtain monodisperse particles, and the like, the existing processes require further steps of separating and dispersing the particles, for example by ultrasonification, to solve the problem of particle aggregation, and the like, after the preparation steps, so productivity decreases and manufacturing costs increase.

DISCLOSURE

Technical Problem

The present invention is intended to provide an apparatus for manufacturing polymer particles and a method for manufacturing the same.

Technical Solution

As a means for solving said problems, the present invention provides an apparatus for manufacturing polymer particles, comprising: a feedstock mixing device that is connected to a feedstock feeder; and a tubular reactor that has an aspect ratio of 3,000 or more connected to said mixing device and configured to carry out polymerization of a mixture fed from the mixing device.

As another means for solving said problems, the present invention provides a method for manufacturing polymer particles, comprising: a first step of introducing a feedstock comprising a monomer to be polymerized into a feedstock mixing device by using a feedstock feeder, and mixing the feedstock in said mixing device; and a second step of introducing the mixture obtained in the first step into a tubular reactor having an aspect ratio of 3,000 or more, and carrying out polymerization of said mixture in such a state that a linear speed of the mixture in the reactor is maintained at 0.5 m/min or more.

Advantageous Effects

The present invention provides an apparatus and a method by which polymer particles that have excellent monodispersity and physical properties, such as a homogeneous crosslinking degree and polymerization degree, and the like can be effectively produced. In the present invention, particles that have excellent monodispersity with the desired particle diameter and also having a high degree of crosslinking, a core-shell structure or core-double shell structure may be effectively prepared. In addition, the steps for manufacturing said polymer particles are exceptionally reproducible in the present invention. Additionally, the present invention provides an apparatus and a method, by which particle diameter, shape, cross-linking degree, polymerization degree or structure and concentration of solid content in a polymer solution, and the like, may be freely controlled according to the intended purpose.

BEST MODE FOR CARRYING OUT INVENTION

Figure 1:
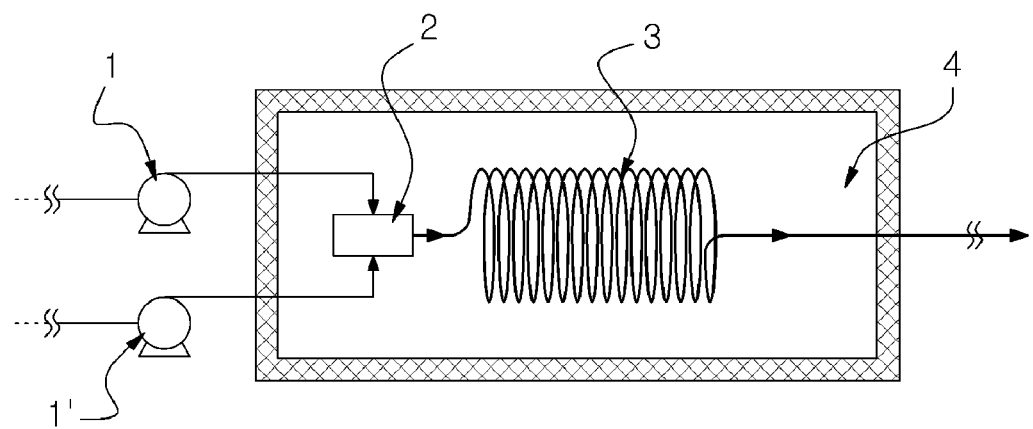
FIG. 1 to 4 show schematics of illustrative embodiments of apparatuses for manufacturing polymer particles.

The present invention relates to an apparatus for manufacturing polymer particles comprising a feedstock mixing device that is connected to a feedstock feeder; and a tubular reactor that has an aspect ratio of 3,000 or more connected to the mixing device and configured to carry out polymerization of a mixture that is fed from the mixing device.

The present manufacturing apparatus is explained in more detail below.

The present manufacturing apparatus may be used as a continuous manufacturing apparatus which is applied to a process for continuously preparing the desired polymer particles.

The kind of feedstock feeder included in the apparatus is not particularly limited. Any kind of unit which may feed a feedstock into the feedstock mixing device or the tubular reactor in such a way that an input flow rate of the feedstock is controllable may be used as the feeder. The term "input flow rate" used herein refers to the volume of a feedstock that is introduced into the mixing device or the tubular reactor per hour. By using the feeder as above, it is possible to effectively control the particle diameter, shape, polymerization degree or cross-linking degree, and the like, of produced polymer particles by controlling the input flow rate when introducing the feedstock. A metering pump may be used as the feeder, but the feeder is not limited thereto.

Also, the present apparatus may include at least two feedstock feeders that are connected to the feedstock mixing device. Generally, the feedstock for preparing polymer particles comprises various components such as a monomer, a crosslinking agent, a polymerization initiator, a catalyst, a stabilizer, a solvent, and the like. Thus, if needed, using at least two feeders, at least two feedstocks, which are prepared by dividing a single component, or mixing at least one component separately, may be introduced simultaneously or sequentially into the same inlet or multiple inlets of the mixing device or the tubular reactor.

The present apparatus includes a feedstock mixing device that is connected to the feedstock feeder. The term "B connected to A" used herein refers to such a state that A and B are connected to each other, so that a flow of a feedstock, a reactant thereof, and the like, may be controlled to move from A to B or from B to A. In addition, said term may include a case that A and B are connected so as to have a separate unit between them (for example, A-C-B) as well as a case that A and B are directly connected.

In the present apparatus, a step of mixing feedstocks fed from the feeder may be carried out prior to introducing the feedstock into the tubular reactor, using the mixing device. Therefore, a homogeneously mixed state may be maintained throughout an inlet and an outlet in the tubular reactor, so that polymer particles, of which physical properties such as crosslinking degree, polymerization degree, shape and particle diameter are homogeneously maintained, may be prepared. Especially, as explained below, if the present tubular reactor is installed so that dispersion polymerization may be carried out in the reactor, having the mixing device installed in a front part of the reactor makes it possible to prepare monodisperse particles by forming seeds having a homogeneous size.

As long as the mixing device may mix the feedstocks fed from at least one feeder, and introduce the mixture into the tubular reactor by controlling the input flow rate, any kind of device may be used as the mixing device. For example, a T mixer, a microchannel mixer (or micromixer), a static (in-line) mixer, and the like may be used. Especially, the microchannel mixer may be used as said mixing device. Said microchannel mixer has a fine mixing channel that is formed on the inside, and can produce a homogeneously mixed feedstock and uniform seed particles.

The present manufacturing apparatus comprises a tubular reactor that is connected to the mixing device, and configured to carry out polymerization of the mixture introduced from the mixing device.

The kind of polymerization reaction carried out in the tubular reactor is not particularly limited, but said reaction is preferably dispersion polymerization. Various methods for preparing polymer particles, such as emulsion polymerization, suspension polymerization, dispersion polymerization, and the like, are known. In emulsion polymerization or suspension polymerization, the polymerization reaction is carried out such that feedstocks that are immiscible to each other are phase-separated in the reaction system, and then polymer particles are prepared. That is, in suspension polymerization, the monomers to be polymerized are immiscible with respect to the solvent, such as water, and the initiator. Therefore, by using a homogenizer, and the like, said monomers and initiator are vigorously stirred so as to prepare a fine suspension, and then subjected to a polymerization reaction to prepare particles. In this case, it is difficult to control an emulsion size in the suspension, and therefore monodispersity of the prepared particles cannot be easily secured. Furthermore, in emulsion polymerization, the monomers to be polymerized and the initiator are immiscible with respect to the solvent, such as water. In this case, the polymerization reaction proceeds in a phase-separation state formed by stirring to produce particles. Even in this case, it is very difficult to secure homogeneity of the formed micelle and to secure monodispersity. Especially, in emulsion polymerization, it is very difficult to prepare particles having monodispersity while having a practical particle diameter, for example, about 1 μm to 10 μm.

Contrary to the above, in dispersion polymerization, polymerization reactions progress by decomposition of an initiator in such a state that feedstocks such as monomers, a stabilizer and a dispersant form a homogeneous single phase without phase-separation. That is, in dispersion polymerization, the reaction progresses in a dispersing medium, seeds are produced, and then particles having monodispersity are prepared.

The tubular reactor may have an aspect ratio of 3,000 or more, preferably 9,000 or more, more preferably 100,000 or more, and most preferably 150,000 or more. The term "aspect ratio" used herein refers to a ratio (L/D) of the length (L) of the tubular reactor with respect to the inner diameter (D) of the tubular reactor. By controlling the aspect ratio to be in a range of 3,000 or more, it becomes possible to prevent a phenomenon whereby the unit activity of particles is lowered by the residue monomer in the tubular reactor and thus physical properties such as polymer particle diameter and crosslinking degree become heterogeneous. The upper limit of the aspect ratio of the tubular reactor is not particularly limited. If the aspect ratio of the tubular reactor becomes too high, it is difficult to secure a good flow of the feedstock, so that physical properties of the prepared particles are in danger of being heterogeneous. Therefore, it may be controlled in a range of 3,000,000 or less, preferably 2,000,000 or less, and more preferably 1,000,000 or less.

The tubular reactor may have an average inner diameter (D) of 0.5 mm to 10 mm. By controlling the average inner diameter of the tubular reactor in said range, it is possible for the feedstock to not become aggregated in the reactor, and therefore good flows can be secured and the linear speed in the reactor can be effectively controlled.

Without particularly limiting the materials constituting the tubular reactor, general materials such as stainless steel, and the like may be used. However, in order to prevent corrosion of the reactor or decrease flowability resulting from aggregation or deposits of the feedstock, the tubular reactor may be made of fluorine resin or the inside thereof may be coated with fluorine resins. Any kind of fluorine resin may be used herein. For example, Teflon, specifically polytetrafluoroethylene (PTFE), tetrafluoroethylene-hexafluoropropylene copolymer (FEP), tetrafluoroethylene-perfluoroalkylvinylether copolymer (PFA) or polyvinylidene fluoride (PVDF), and the like, may be used.

The tubular reactor may be installed in a chamber in which the temperature can be controlled, such as a constant temperature chamber. Therefore, the reaction conditions such as temperature and pressure within the reactor may be controlled, depending on the feedstock used and the desired particles.

FIG. 1 shows one illustrative embodiment of the present apparatus. As represented in FIG. 1, the present apparatus may include at least one feedstock feeder 1, 1', a mixing device 2 that is connected to said feeder 1, 1', such as a microchannel mixer, and a tubular reactor 3 that is connected to said mixing device 2. In addition, said mixing device 2 and tubular reactor 3 may be installed in a constant temperature chamber 4. Considering the efficiency of installing units, said tubular reactor 3 herein may be installed in a coil shape, as represented in FIG. 1, but the shape of the reactor is not limited to the above coil shape.

Figure 2:
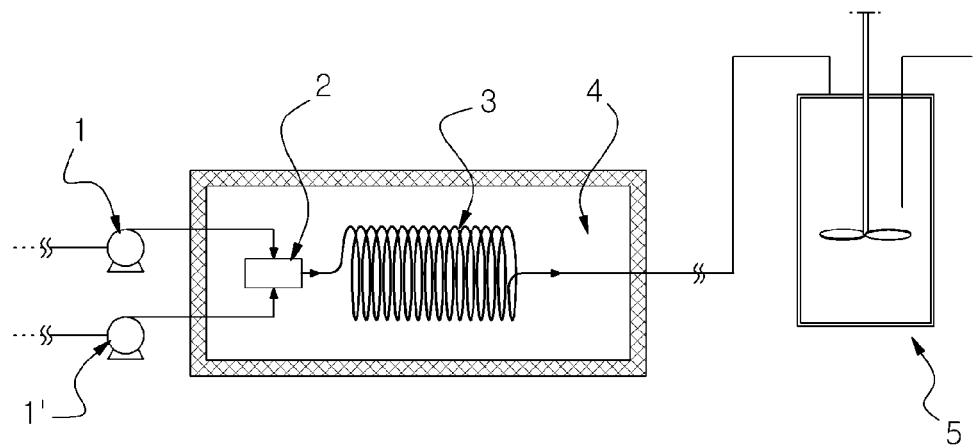

The present apparatus for manufacturing polymer particles may be connected to various additional devices, including a conventional batch-type device, if necessary. Therefore, it is possible to subject the prepared polymer particles to additional processes, so as to prepare particles having various functions. FIG. 2 shows another illustrative embodiment of the present manufacturing apparatus, and, as shown in FIG. 2, in the present invention, the tubular reactor 3 may be connected to a conventional batch-type device 5.

Figure 3:
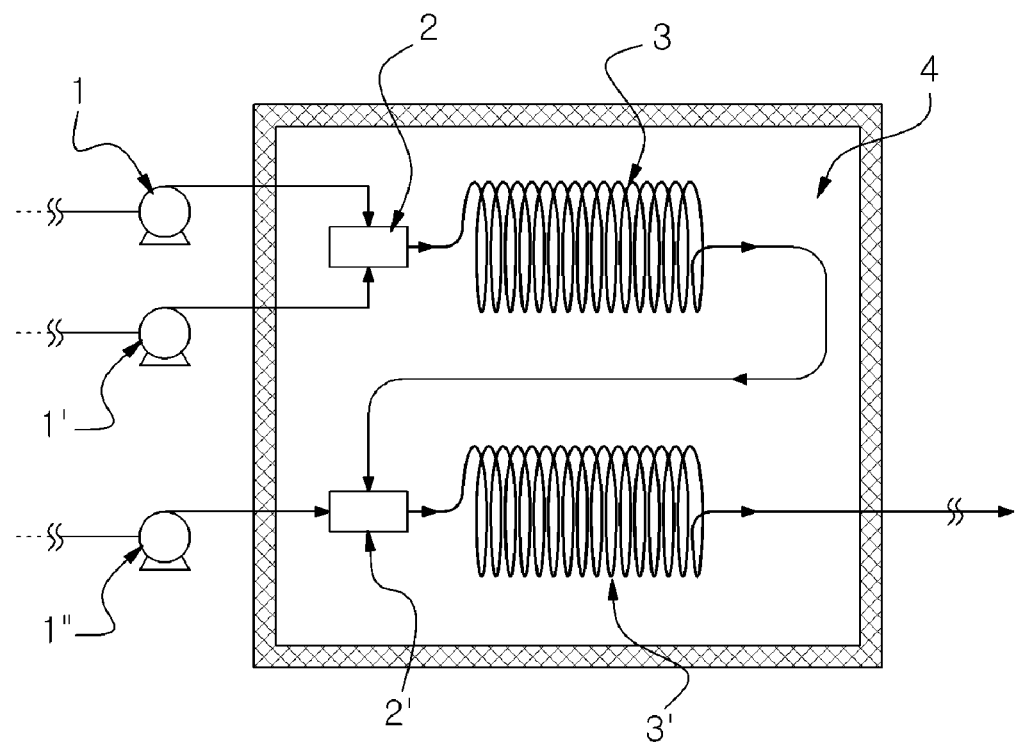
Figure 4:
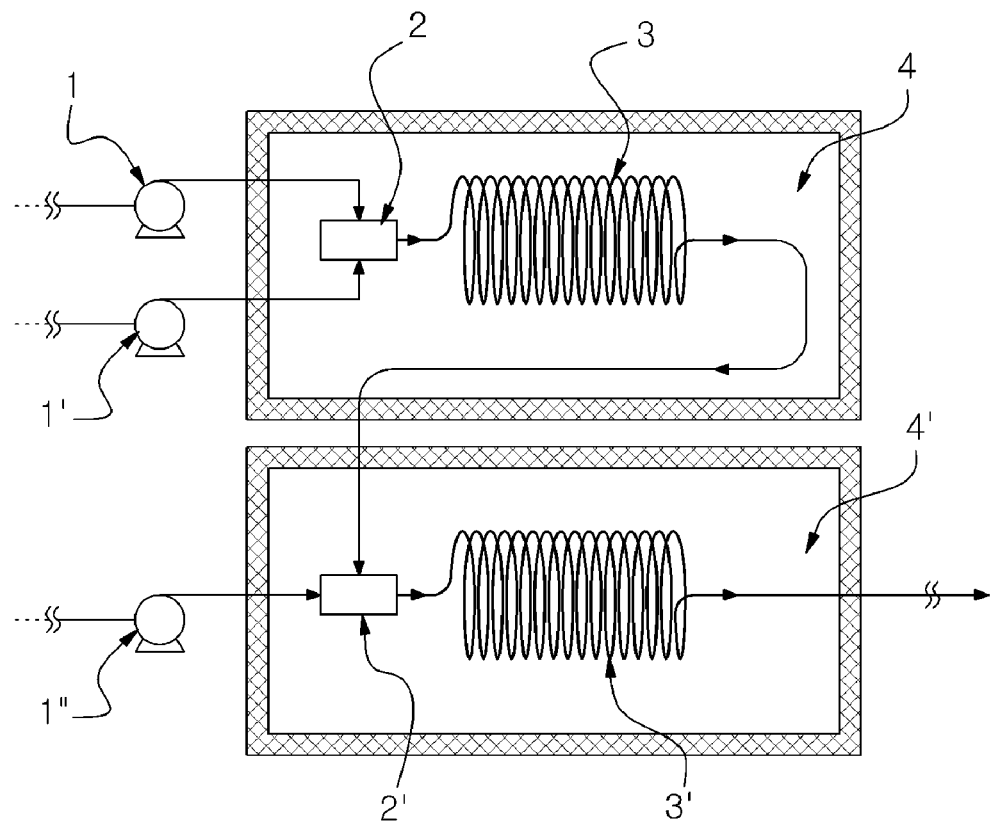
Figure 5:
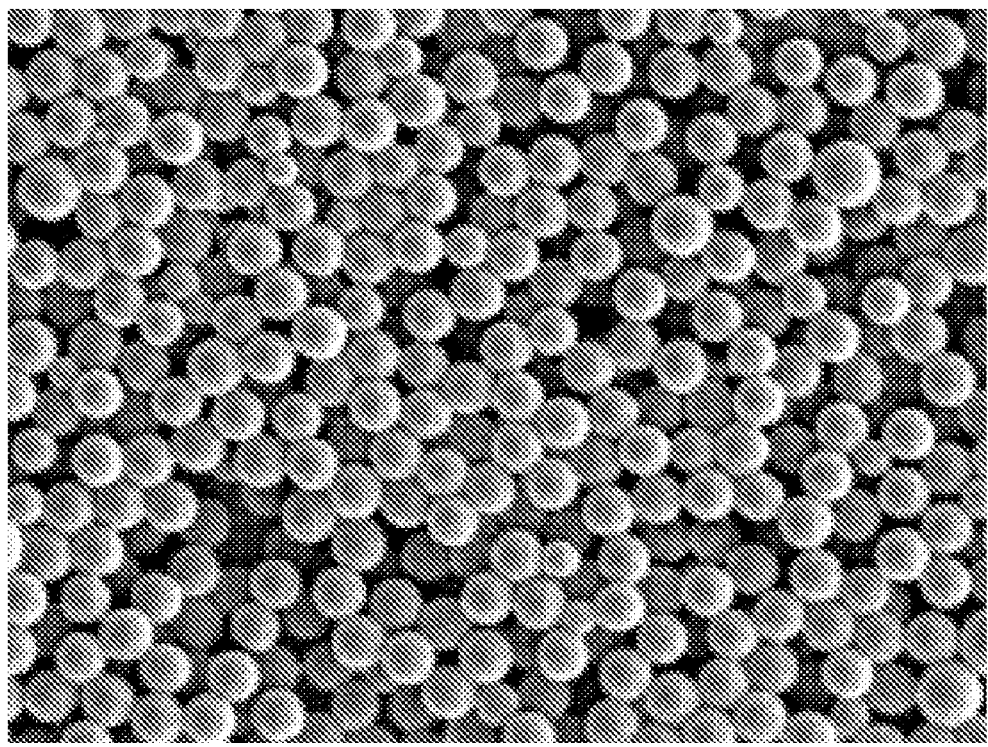
FIG. 5 to 12 show SEM images of polymer particles prepared according to examples and comparative examples.
Figure 6:
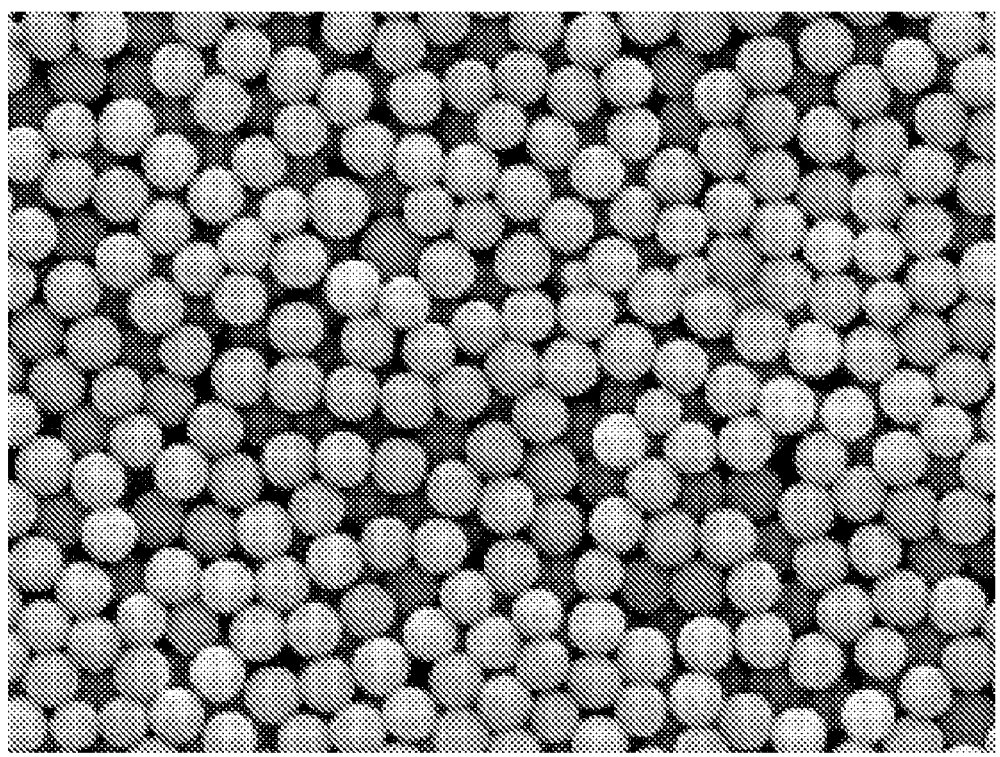
Figure 7:
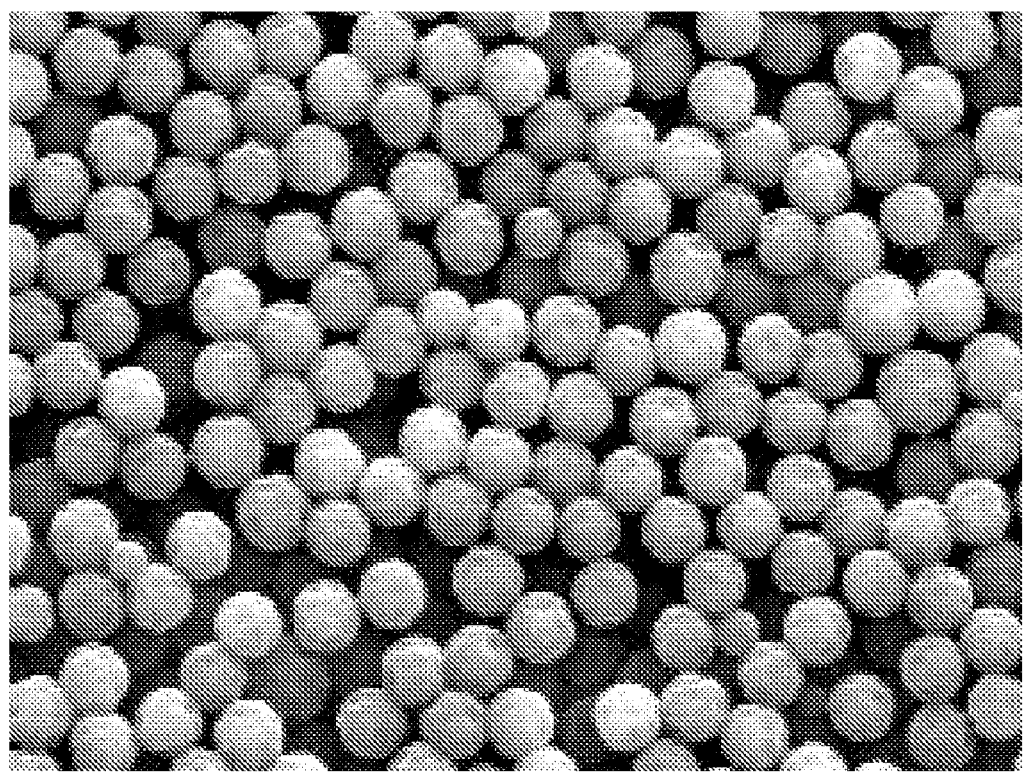

As shown in FIG. 3 or 4, the present apparatus may be connected to an additional apparatus for manufacturing polymer particles including a tubular reactor 3', if necessary.

That is, the manufacturing apparatus may further comprise a second tubular reactor connected to the aforementioned tubular reactor (hereinafter, referred to as "first tubular reactor") and a feedstock feeder connected to the second tubular reactor.

By connecting at least two tubular reactors as above, it is possible to introduce the reactant reacted in the first tubular reactor into the second tubular reactor, and subject the reactant to an additional reaction inside the second tubular reactor. In this case, the feedstock feeder connected to the second tubular reactor may be configured to introduce a crosslinking agent or additional raw materials, which are capable of forming a shell on the surface of particles formed in the first tubular reactor, into the second tubular reactor.

If the present manufacturing apparatus comprises at least two tubular reactors, said apparatus may further comprise a mixing device connected to a first tubular reactor (specifically, an outlet of the first tubular reactor), a second tubular reactor (specifically, an inlet of the second tubular reactor) and a feedstock feeder connected to the second tubular reactor. Therefore, the reactant from the first tubular reactor may be homogeneously mixed with a raw material such as a crosslinking agent or raw materials for forming a shell, and the mixture may then be introduced into the second tubular reactor, so that an effective reaction may be performed.

If the present manufacturing apparatus comprises an additional tubular reactor (a second tubular reactor), a feedstock feeder or a mixing device, the specific kinds thereof are not particularly limited. For example, the additional reactor, and the like, may be appropriately selected within the categories of tubular reactors, feedstock feeders and mixing devices as mentioned above, depending on the purposes of the reactions. For example, an aspect ratio of said second tubular reactor may be determined considering the desired thickness of the shell in polymer particles having a core-shell structure, and, for example, said aspect ratio of the second tubular reactor may be controlled to be the same as that of the first tubular reactor, or about ¼ of the aspect ratio or more, and preferably about ½ the aspect ratio of the first tubular reactor, but is not limited thereto.

If the present manufacturing apparatus comprises two tubular reactors, each reactor may be installed in the same chamber (for example, a constant temperature chamber 4), as in FIG. 3, or optionally in separate chambers (for example, constant temperature chambers 4, 4'), as in FIG. 4. When each of the reactors is installed in separate chambers, polymerization conditions (for example, polymerization temperature and pressure, and the like) in each reactor may be set different from each other.

The present manufacturing apparatus may also comprise at least two tubular reactors, and the like, if necessary. For example, the present manufacturing apparatus may further comprise a third tubular reactor connected to said second tubular reactor and a feedstock feeder by which raw materials can be feed inside said third tubular reactor. In addition, in the above case, the present manufacturing apparatus may further comprise a feedstock mixing device connected to said second tubular reactor, the third tubular reactor, and the feedstock feeder connected to said third tubular reactor.

If the present manufacturing apparatus comprises at least two tubular reactors connected to each other as above, particles may be effectively prepared which have, especially, a crosslinked structure, a core-shell structure or a core-double shell structure and excellent monodispersity as well. The term "polymer particles having a core-shell structure" used herein may include a case (for example, core-shell-shell structure) comprising a core and a shell, within which the core is enclosed, wherein said shell is formed in at least two layers, as well as a case of forming a single core and a single shell, within which the core is enclosed, in particles.

As mentioned above, dispersion polymerization has an advantage in preparing particles having excellent monodispersity and a practical particle diameter over emulsion polymerization or suspension polymerization. When the crosslinked polymer particles or the particles having a core-shell structure are prepared by dispersion polymerization, the prepared particles tend to have a wide particle diameter distribution, their shapes are damaged, and are easily aggregated. However, by connecting at least two tubular reactors to the manufacturing apparatus as the present invention, for example, by introducing the reactant discharged from the first tubular reactor into the second tubular reactor continuously or intermittently and additionally subjecting it to a reaction, crosslinked polymer particles having monodispersity and a uniform shape, and the like, or polymer particles having a core-shell structure may be effectively prepared.

According to said apparatus of the present invention, polymer particles, crosslinked polymer particles or core-shell polymer particles having excellent monodispersity and uniform physical properties such as polymerization degree or crosslinking degree may be effectively prepared.

The present apparatus may be an apparatus for preparing polymer particles having an average diameter of, specifically, 0.1 μm to 10 μm, preferably 0.1 μm to 5 μm, and more preferably 2 μm to 5 μm. In addition, the present apparatus may be, for example, an apparatus for preparing polymer particles having a CV (coefficient of variation) value of 5 or less, preferably 4 or less, and more preferably about 3.

The present invention also relates to a method for manufacturing polymer particles, comprising: a first step of introducing a feedstock including a monomer to be polymerized into a feedstock mixing device by using a feedstock feeder, and mixing them therein; and a second step of introducing the mixture obtained in the first step into a tubular reactor having an aspect ratio of 3,000 or more and subjecting it to a polymerization reaction therein, in such a state that the linear speed of the mixture is maintained at 0.5 m/min or more.

In one embodiment of the present invention, said method for preparing polymer particles may be a continuous preparation method that is carried out in the aforementioned manufacturing apparatus. That is, in one embodiment, the method may be a method for continuously manufacturing polymer particles.

In the first step, feedstocks comprising monomers to be polymerized are introduced into a mixing device through a feedstock feeder, and then mixed in the mixing device.

The feeder used in the first step may be a metering pump that is capable of controlling an input flow rate of the feedstocks, wherein the input flow rate of feedstocks in the first step may be controlled in a range of about 0.1 ml/min to 80 ml/min. In the present invention, considering the aspect ratio and/or inner diameter of the tubular reactor, the input flow rate of the feedstocks is controlled within the above range, and therefore the linear speed of the feedstocks inside the tubular reactor may be controlled, so that a retention time or a reaction time of a feedstock may be controlled effectively.

In the present invention, the kinds of feedstocks introduced during the first step are not particularly limited. In one embodiment, the feedstocks may comprise components that are conventionally used in preparing polymer particles, for example, in preparing polymer particles by dispersion polymerization.

Said feedstock herein may comprise a monomer for forming polymer particles. In this case, the monomer may include alkyl (meth)acrylate, alicyclic (meth)acrylate, (meth)acrylamide, vinyl acetate, alkenyl (meth)acrylate, aryl (meth)acrylate, alkylaryl (meth)acrylate, aralkyl (meth)acrylate, fluoroalkyl (meth)acrylate, (meth)acrylate comprising nitrogen, (meth)acrylic acid and other vinyl monomers, and the like, but is not limited thereto. A specific example of the usable monomer herein may include methyl (meth)acrylate, ethyl (meth)acrylate, propyl (meth)acrylate, butyl (meth)acrylate, isobutyl (meth)acrylate, isobornyl (meth)acrylate, itaconic acid, glycidyl (meth)acrylate, hexyl (meth)acrylate, cyclohexyl (meth)acrylate, 2-ethylhexyl (meth)acrylate, octyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, cosyl (meth)acrylate, eicosyl (meth)acrylate, 2-hydroxyethyl (meth)acrylate, 2-hydroxypropyl methacrylate, acetoacetoxy (meth)acrylate, γ-propyl tri($C_1$-$C_6$)alkoxy silyl (meth)acrylate, γ-propyl tri($C_1$-$C_6$)alkyl silyl (meth)acrylate, γ-propyl di($C_1$-$C_6$)alkoxy ($C_1$-$C_6$)alkyl silyl (meth)acrylate, γ-propyl di($C_1$-$C_6$)alkyl ($C_1$-$C_6$)alkoxy silyl (meth)acrylate, vinyl tri ($C_1$-$C_6$)alkoxy silyl (meth)acrylate, vinyl di($C_1$-$C_6$)alkoxy ($C_1$-$C_6$)alkyl silyl (meth)acrylate, vinyl ($C_1$-$C_6$)alkoxy di($C_1$-$C_6$)alkyl silyl (meth)acrylate, vinyl tri($C_1$-$C_6$)alkyl silyl (meth)acrylate, styrene, methyl styrene, vinyl toluene, ethylvinyl benzene, vinylnaphthalene, vinylpyridine, vinylxylene, chlorostyrene, bromostyrene, fluorostyrene, cyclopentadiene, allyl monomers, vinylformamide, vinyl chloride, vinyl fluoride, vinyl bromide, vinylidene chloride, vinylidene fluoride and vinylidene bromide, or a mixture of two or more monomers thereof, but is not limited thereto.

In the first step, said feedstock may also comprise an appropriate crosslinking agent or a crosslinkable monomer for preparing the crosslinked polymer particles. General components in this field may also be used as the crosslinking agent. An example of such a crosslinking agent or crosslinkable monomer includes one of ethylene glycol di(meth)acrylate, trimethylolpropane tri(meth)acrylate, allyl (meth)acrylate, diethylene glycol di(meth)acrylate, propylene glycol di(meth)acrylate, 2,2-dimethylpropane-1,3-di(meth)acrylate, 1,3-butylene glycol di(meth)acrylate, 1,4-butanediol di(meth)acrylate, diethylene glycol di(meth)acrylate, 1,6-hexanediol di(meth)acrylate, tripropylene glycol di(meth)acrylate, triethylene glycol di(meth)acrylate, tetraethylene glycol di(meth)acrylate, polyethylene glycol di(meth)acrylate, ethoxylated bisphenol A di(meth)acrylate, poly(butanediol) di (meth)acrylate, pentaerythritol tri(meth)acrylate, trimethylolpropane triethoxy tri (meth)acrylate, glyceryl propoxy tri(meth)acrylate, pentaerythritol tetra(meth)acrylate, divinyl benzene (DVB), vinyl urethane, diallyl ether, diallyl ester, vinyl polyester, trivinyl benzene, divinyl toluene, diallyloxy acetic acid, divinyl pyridine, divinyl naphthalene, divinyl xylene, diethylene glycol divinyl ether, bisacrylamide, triallyl cyanurate, trivinylcylcohexane, divinyl silane, trivinyl silane, dimethyldivinyl silane, divinylmethyl silane, methyltrivinyl silane, diphenyldivinyl silane, trivinylphenyl silane, divinylmethylphenyl silane, tetravinyl silane, dimethylvinyl disiloxane, poly(methylvinyl siloxane), poly(vinylhydrosiloxane) and poly(phenylvinyl siloxane), or a mixture of two or more crosslinkers thereof, but is not limited thereto.

In order to improve polymerization efficiency, said feedstock in the first step may also comprise an appropriate polymerization initiator, a catalyst or a stabilizer, wherein general components in this field may be used as the polymerization initiator, and the like. For example, one of peroxy ester, dialkyl peroxide, alkyl hydroperoxide, persulphate, an azo initiator and a redox initiator, or a mixture of two or more components thereof may be used herein. Specifically, this component may include one of benzoyl peroxide, t-butyl peroctoate, t-amyl peroxy pivalate, cumene hydroperoxide, azobisisobutyronitrile, 2,2'-azobis(2-methylbutanenitrile) and 2,2'-azobis(2-methylpropionitrile), or a mixture of two or more components thereof, but is not limited thereto. If necessary, general polymerization initiators, catalysts or stabilizers in this field may be suitably selected and used herein, without limitation of the aforementioned kinds.

Said components herein may be each dissolved or dispersed in a solvent or a dispersion medium and introduced into the tubular reactor. An example of the usable solvents may include one of a hydrocarbon (for example, alkane), a fluorinated hydrocarbon, an aromatic hydrocarbon, ether, ketone, an ester, alcohol and water, or a mixture of two or more solvents thereof, but is not limited thereto.

In the first step, the above components may be introduced inside the mixing device once in such a state that they are dissolved in a single solvent by using the feeder. Optionally, the above components may be divided into at least two feedstocks, and then the at least two feedstocks may be introduced simultaneously or sequentially into one or at least two separate inlets with at least two feeders. It is preferred herein that, for example, monomers to be polymerized and a polymerization initiator are each dissolved in a suitable solvent separately, and then said two kinds of mixtures are introduced into the tubular reactor with separate feeders.

In the first step, the feedstock is introduced into the mixing device to carry out the mixing process. Thus, the feedstock introduced into the tubular reactor maintains a uniform mixing state, so that the desired polymer particles may be effectively prepared. Especially, when the feedstock is subjected to dispersion polymerization in the second step as described below, uniformity of the seed particle size and monodispersity of polymer particles may be secured from said mixing process.

In the second step, the feedstock mixture mixed in the first step is introduced inside the tubular reactor and subjected to polymerization, for example dispersion polymerization, therein.

In the second step, the linear speed of the feedstock mixture in the tubular reactor may be maintained at 0.5 m/min or more, preferably 1 m/min, and more preferably 3 m/min or more. The term "linear speed" used herein refers to a distance that a feedstock or a reactant flows in the tubular reactor per unit time, which may be regulated by controlling the input flow rate into the reactor. By controlling the linear speed in the reactor at 0.5 m/min or more, a smooth flow of the feedstock or the reactant in the reactor herein may be secured. Especially, said linear speed plays an important role with respect to the aspect ratio of the tubular reactor. That is, if said linear speed becomes too low, it is apprehended that the polymerization reaction is not smoothly performed, since particles generated inside the tubular reactor are precipitated or aggregated. If the linear speed becomes too high, the amount of the residual monomer may increase, so that the reaction efficiency may be also lowered. In the present invention, by controlling the aspect ratio of the tubular reactor and thus setting up the linear speed in the optimum range considering the aspect ratio, the reaction may be smoothly performed without causing said problems. Although the upper limit of the linear speed is not particularly limited, for example, said linear speed may be controlled in a range of 50 m/min or less, considering the retention time of the feedstock or the reactant in the reactor, and the like.

The internal conditions of said tubular reactor to perform polymerization herein may be appropriately selected, considering the kind of polymerization, the feedstock to be used, and desired polymer particles, and the like. In one embodiment, the internal pressure in the tubular reactor may be controlled within the range of 0 bar to 50 bar. In addition, the internal temperature in the tubular reactor may be controlled within the range of 50 to 100. Furthermore, the reaction time or the retention time in the tubular reactor may be controlled within a range of about 1 hour to 10 hours.

In addition, the method may further comprise, if necessary, a third step of introducing the reactant obtained in the second step into a second tubular reactor, and introducing a feedstock, for example a feedstock for forming a shell part, into said second tubular reactor by using an additional feedstock feeder; and a fourth step of reacting the introduced feedstock in the second tubular reactor.

In this case, said third step may comprise (1) a step of introducing said reactant and feedstock into the mixing device, and mixing them in the mixing device; and (2) a step of introducing the mixture obtained in the step (1) into the second tubular reactor.

By performing the above additional steps, particles having a core-shell structure may be effectively prepared. Here, the input flow rate of a feedstock into the second tubular reactor, the linear speed and the reaction conditions inside the reactor, and the like, are not particularly limited, and they may be, for example, be appropriately regulated within the range of each condition in the first reactor as described above, depending on the intended purpose of the particles.

In addition, by controlling the aspect ratio of the second tubular reactor or the linear speed inside the reactor, and the like, at the third step or the fourth step, the thickness, shape or physical properties of the shell part, and the like may be regulated. For example, if the linear speed in the second reactor decreases by controlling the input flow rate, particles having a wrinkled shell part may be prepared. Contrary to this, if the linear speed in the second reactor increases by controlling the input flow rate, particles having no wrinkle on the surfaces and having a smooth appearance may be obtained.

Furthermore, the method may further comprise, if necessary, a fifth step of introducing the reactant obtained in the fourth step into a third tubular reactor and introducing a feedstock into said third tubular reactor by using an additional feedstock feeder; and a sixth step of reacting the introduced feedstock and reactant in the third tubular reactor. In addition, said fifth step may comprise (a) a step of introducing a reactant and a feedstock into a mixing device and mixing them in said mixing device; and (b) a step of introducing the mixture obtained via the step (a) into the third tubular reactor.

According to the method, polymer particles, crosslinked polymer particles or core-shell polymer particles having excellent monodispersity and uniform physical properties such as polymerization degree or crosslinking degree may be effectively prepared.

The aforementioned polymer particles prepared by the method of the present invention may each have an average diameter of, for example, 0.1 µm to 10 µm, preferably 0.1 µm to 5 µm, and more preferably 2 µm to 5 µm. In addition, the particles prepared according to the present invention may have, for example, a CV (coefficient of variation) value of 5 or less, preferably 4 or less, and more preferably about 3.

In the present invention, through installation of additional tubular reactors in the apparatus or control of their aspect ratios or linear speeds, and the like, the physical properties such as size of polymer particles, crosslinking degree, polymerization degree and structure may be effectively controlled with respect to the intended purpose. Furthermore, in the present invention, physical properties such as concentration of solid content in the finally discharged reaction solution may be effectively controlled by controlling the composition of a feedstock to be introduced into the tubular reactor, and the like.

EXAMPLES

The present invention is explained in more detail through examples according to the present invention and comparative examples which do not correspond to the present invention, but the scope of the present invention is not restricted to the examples described below.

Example 1

Using the apparatus as shown in FIG. 1, polystyrene polymer particles were prepared. In particular, a first feedstock mixture (Feed 1) comprising 9.0 parts by weight of styrene, 36.5 parts by weight of ethanol and 4.4 parts by weight of a stabilizer; and a second feedstock mixture (Feed 2) comprising 0.5 parts by weight of 2,2'-azobis(2-methylpropionitrile), 41.5 parts by weight of ethanol and 8.1 parts by weight of water were prepared. Then, said first feedstock mixture and said second feedstock mixture were introduced into a mixer (microchannel mixer) 2, using a first metering pump 1 and a second metering pump 1', respectively. The first and second mixture were mixed in said mixer, and then the resulting mixture was introduced into a tubular reactor (aspect ratio: 600,000) 3 in such a state that the linear speed in the reactor 3 was maintained at about 3 m/min Then, dispersion polymerization was performed in the reactor 3 to prepare polymer particles. Here, said polymerization was performed at a pressure of 15 bar and a temperature of 70. The polystyrene polymer particles, which were prepared through the above steps, had an average diameter of about 3 µm.

Example 2

By using the apparatus as shown in FIG. 3, in which two tubular reactors were connected to each other in series, crosslinked polystyrene particles (average diameter: 3.5 µm) were prepared by a continuous reaction process. In particular, a first feedstock mixture (Feed 1) comprising 8.9 parts by weight of styrene, 18.3 parts by weight of ethanol and 2.1 parts by weight of a stabilizer; a second feedstock mixture (Feed 2) comprising 0.5 parts by weight of 2,2'-azobis(2-methylpropionitrile), 41.2 parts by weight of ethanol and 8.5 parts by weight of water; and a third mixture (Feed 3) comprising 0.5 parts by weight of divinyl benzene (DVB) and 19.7 parts by weight of ethanol were prepared respectively.

Subsequently, said first feedstock mixture and said second feedstock mixture were introduced into a mixer (microchannel mixer) 2 by using a first metering pump 1 and a second metering pump 1' respectively, the introduced first and second feedstock mixtures were mixed, and then the resulting mixture was introduced into a first tubular reactor (aspect ratio: 600,000) 3. Then, dispersion polymerization (polymerization pressure: 15 bar, polymerization temperature: 70) was performed in such a state that the linear speed in the first tubular reactor was maintained at about 3 m/min to prepare polymer particles. Subsequently, the prepared polymer particles were introduced into a second mixer (microchannel mixer) 2', and the third feedstock mixture was introduced into said second mixer 2' by using a third metering pump 1". The polymer particles and the third feedstock mixture were mixed in the second mixer 2', and the resulting mixture was introduced into a second reactor (aspect ratio: 200,000) 3'. A reaction (pressure: 20 bar, temperature: 70) was performed in the second tubular reactor 3' to prepare the crosslinked polystyrene particles.

Example 3

By using the apparatus as shown in FIG. 4, in which two tubular reactors, each of which was installed in separate constant temperature chambers, were connected in series, crosslinked polystyrene particles (average diameter: 3.5 μm) were prepared by a continuous reaction process. In particular, a first feedstock mixture (Feed 1) comprising 8.9 parts by weight of styrene, 2.1 parts by weight of a stabilizer and 18.3 parts by weight of ethanol; a second feedstock mixture (Feed 2) comprising 0.5 parts by weight of 2,2'-azobis(2-methylpropionitrile, 41.2 parts by weight of ethanol and 8.5 parts by weight of water; and a third mixture (Feed 3) comprising 0.3 parts by weight of pentaerythritol triacrylate (PETA) and 19.4 parts by weight of ethanol were prepared respectively. Said first feedstock mixture and said second feedstock mixture were introduced into a mixer (microchannel mixer) 2 by using a first metering pump 1 and a second metering pump 1' respectively, the introduced first and second feedstock mixtures were mixed, and the resulting mixture was introduced into a first tubular reactor (aspect ratio: 600,000) 3. Then, dispersion polymerization (polymerization pressure: 15 bar, polymerization temperature: 70) was performed in such a state that the linear speed in the first tubular reactor was maintained at about 3 m/min to prepare polymer particles. Subsequently, the prepared polymer particles were introduced into a second mixer (microchannel mixer) 2', and said third feedstock mixture was introduced into said second mixer 2' by using a third metering pump 1". The polymer particles and the third feedstock mixture were mixed in said second mixer 2', and said mixture was introduced into a second reactor (aspect ratio: 200,000) 3', and a reaction (pressure: 15 bar, temperature: 75) was performed in said second tubular reactor 3' to prepare the crosslinked polystyrene particles.

Example 4

Polymer particles were prepared by the same method as Example 2, except that the linear speed of the feedstock in the second tubular reactor was maintained at about 0.5 m/min.

Example 5

Polymer particles were prepared by the same method as Example 2, except that the linear speed of the feedstock in the second tubular reactor was maintained at about 3 m/min.

Example 6

By using the apparatus for manufacturing polymer particles in which a third tubular reactor (aspect ratio: 200,000), a fourth feedstock feeder and a third mixing device were additionally installed in the apparatus as shown in FIG. 3, and the third mixing device was installed so as to be connected to the second tubular reactor 3', the third tubular reactor and the fourth feedstock feeder, crosslinked polystyrene particles were prepared. In particular, the reaction was performed under the same conditions as in Example 2 until the second tubular reactor 3'. After that, the reactant from the second tubular reactor 3' was introduced into the third mixing device (microchannel mixer) and a fourth feedstock mixture (Feed 4) comprising 0.3 parts by weight of pentaerythritol triacrylate (PETA) and 19.4 parts by weight of ethanol was introduced into the third mixer (microchannel mixer) by using a metering pump (fourth feedstock feeder). In the third mixer, the reactant and the fourth feedstock mixture were mixed, and then the mixture was introduced into the third tubular reactor so as to perform the reaction. Here, the input flow rate of the mixture mixed in said third mixer into the third tubular reactor was controlled to about 5 ml/min The reaction was performed by controlling the reaction pressure in said third tubular reactor at about 15 bar and a temperature of about 75 to prepare the crosslinked polystyrene particles.

Example 7

By using the apparatus in which a tubular reactor and a continuous stirring tank reactor were connected in series, crosslinked polystyrene particles were prepared. In particular, a first feedstock mixture (Feed 1) comprising 8.9 parts by weight of styrene, 2.1 parts by weight of a stabilizer and 18.3 parts by weight of ethanol; a second feedstock mixture (Feed 2) comprising 0.5 parts by weight of 2,2'-azobis(2-methylpropionitrile), 41.2 parts by weight of ethanol and 8.5 parts by weight of water; and a third mixture (Feed 3) comprising 0.5 parts by weight of pentaerythritol triacrylate (PETA) and 19.7 parts by weight of ethanol were prepared respectively. Subsequently, said first feedstock mixture and said second feedstock mixture were introduced into a mixer (microchannel mixer) by using a first metering pump and a second metering pump respectively, the introduced first and second feedstock mixtures were mixed, and the resulting mixture was introduced into a first tubular reactor (aspect ratio: 600,000). Then, dispersion polymerization (polymerization pressure: 15 bar; polymerization temperature: 70) was performed in the first tubular reactor to prepare polymer particles. Subsequently, the prepared polymer particles were fed into the continuous stirring tank reactor and said third mixture was also fed into said continuous stirring tank reactor by the metering pump. Here, the synthesized polymer particles and the third feedstock mixture were injected to the continuous stirring tank reactor simultaneously, while operating the stirrer installed in the continuous stirring tank reactor (stirring speed: 300 rpm). The reaction was performed in the continuous stirring tank reactor for 2 hours to prepare the crosslinked polystyrene particles, and the prepared particles were discharged via a pump connected to an outlet of the continuous stirring tank reactor.

Comparative Example 1

By using a first feedstock mixture comprising 8 parts by weight of styrene and 80 parts by weight of ethanol; a second feedstock mixture comprising 4 parts by weight of 2,2'-azobis (2-methylpropionitrile) and 6.4 parts by weight of water; and 1.6 parts by weight of divinyl benzene (DVB) as a crosslinker, polystyrene polymer particles were prepared by the conventional batch-type reaction.

Comparative Example 2

Polymer particles were prepared by the same method as Example 1 except a reactor having an aspect ratio of 2,500 was used as a tubular reactor.

Test Example 1

Figure 8:
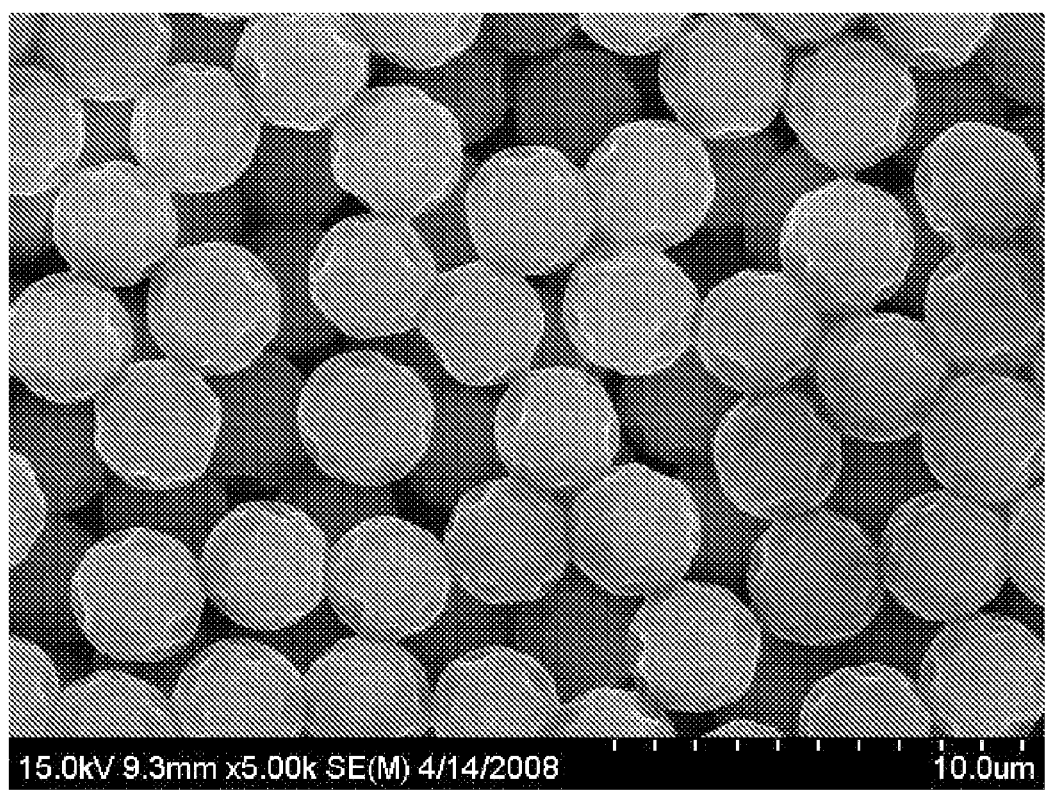
Figure 9:
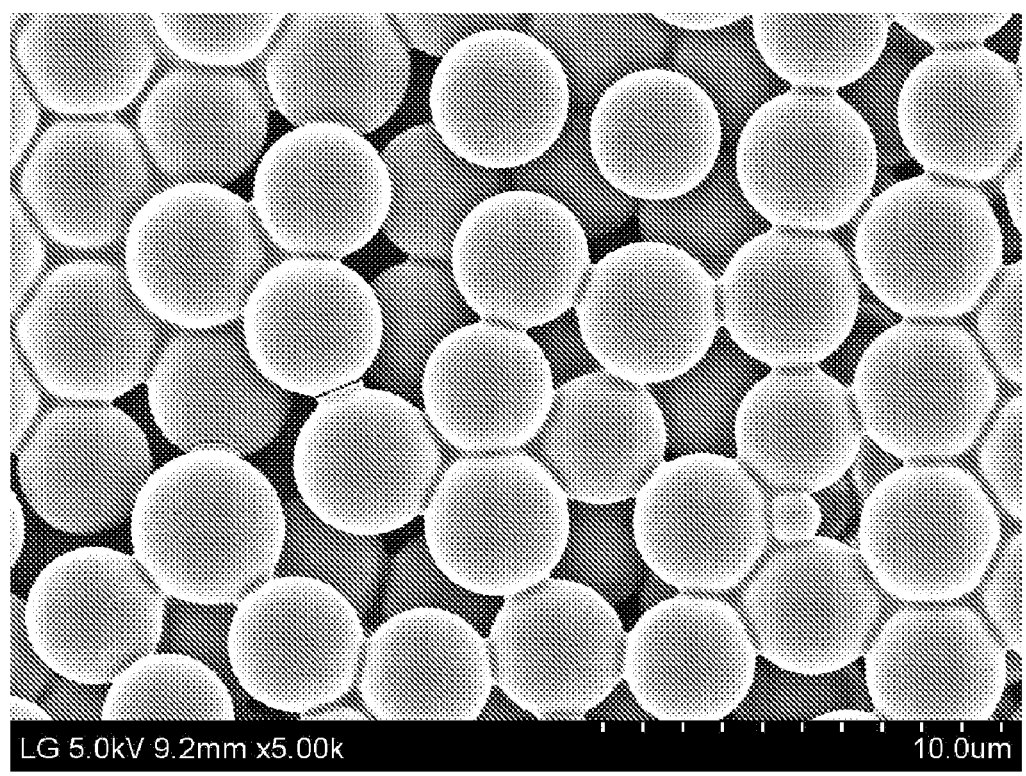
Figure 10:
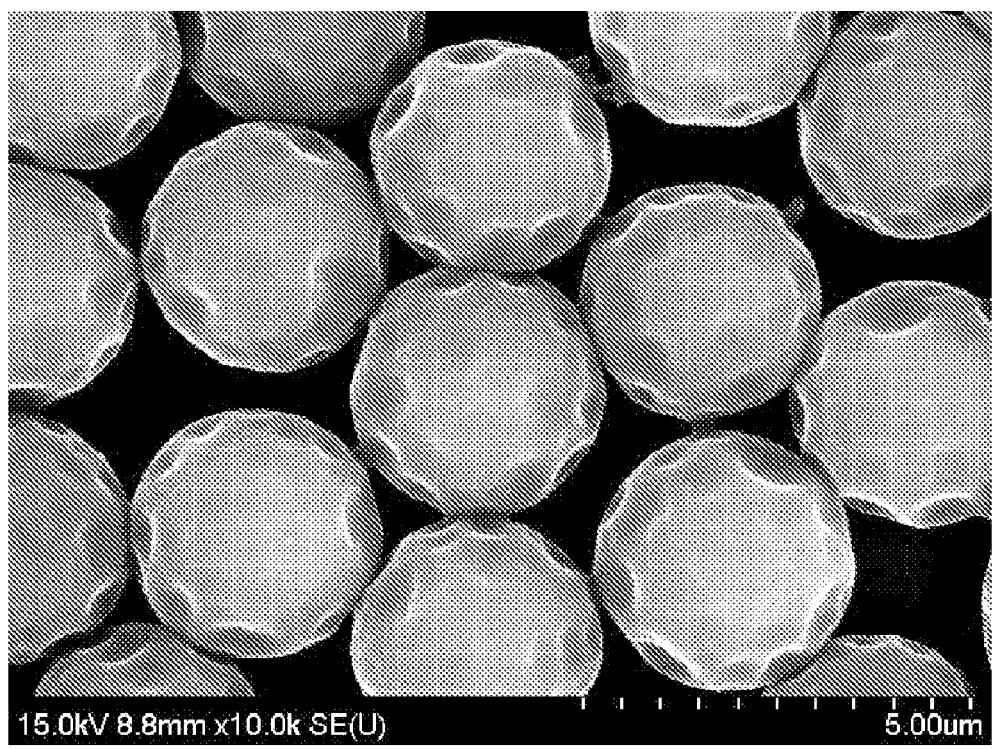
Figure 11:
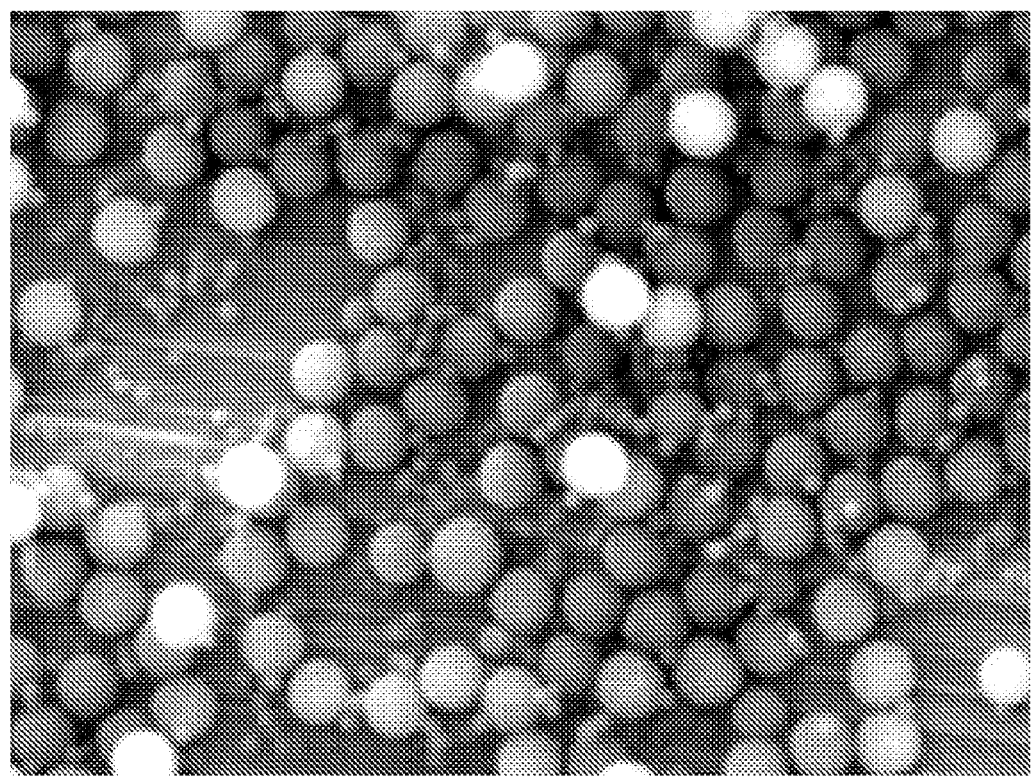
Figure 12:
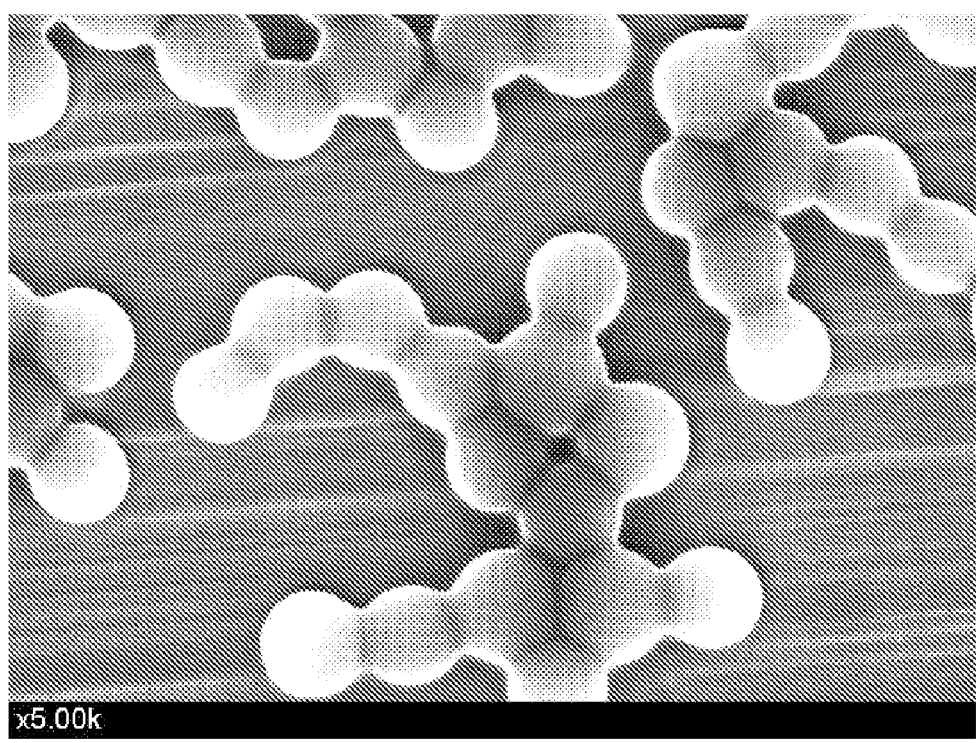

By using Scanning Electron Microscopy (SEM), the monodispersities of polymer particles prepared in Examples 1 to 6 and Comparative Examples 1 and 2 were evaluated respectively. The attached FIG. 5 to 10 represent SEM images of particles prepared in Examples 1 to 6 respectively, and FIGS. 11 and 12 represent SEM images of particles prepared in Comparative Examples 1 and 2 respectively. As can be seen from FIG. 5 to 10, it was confirmed that the polymer particles prepared according to the present invention have excellent monodispersity. Particularly, it can be confirmed that the surface shape of particles may be controlled by controlling the linear speed, namely, the input flow rate as a result of Examples 4 and 5 (FIGS. 8 and 9).

Meanwhile, in the case of the polymer particles of Comparative Example 1 prepared by the conventional batch-type reaction, it could be confirmed that polydisperse particles that have very low monodispersity were produced (FIG. 11). In the case of using a tubular reactor having an aspect ratio of less than 3,000, the conversion ratio of the introduced feedstock was lowered and the residual monomers increased so as to lower unit activity of particles, so that particles were precipitated and the tubular reactor was clogged. Therefore, it could be confirmed that it was impossible to prepare monodisperse particles (FIG. 12).

The invention claimed is:

1. An apparatus for manufacturing polymer particles, comprising:
    a feedstock mixing device connected to a feedstock feeder; and
    a tubular reactor that has an aspect ratio of 3,000 or more, the tubular reactor being connected to said mixing device and configured to carry out polymerization of a mixture fed from the mixing device.

2. The apparatus for manufacturing polymer particles according to claim 1,
    wherein the feedstock mixing device is a microchannel mixer.

3. The apparatus for manufacturing polymer particles according to claim 1,
    wherein the polymerization reaction is dispersion polymerization.

4. The apparatus for manufacturing polymer particles according to claim 1, wherein the tubular reactor has an aspect ratio of 9,000 or more.

5. The apparatus for manufacturing polymer particles according to claim 1, wherein the inside of the tubular reactor consists of a fluorine resin.

6. The apparatus for manufacturing polymer particles according to claim 1, further comprising a second tubular reactor connected to the tubular reactor and a second feedstock feeder connected to said second tubular reactor.

7. The apparatus for manufacturing polymer particles according to claim 6, further comprising a feedstock mixing device connected to the tubular reactor, the second tubular reactor, and the feedstock feeder connected to said second tubular reactor.

8. The apparatus for manufacturing polymer particles according to claim 1,
    wherein the polymer particles are crosslinked polymer particles or polymer particles having a core-shell structure.

9. The apparatus for manufacturing polymer particles according to claim 1,
    wherein the polymer particles have an average diameter of 0.1 to 10 µm.

10. The apparatus for manufacturing polymer particles according to claim 1,
    wherein the polymer particle have a CV value of 5 or less.

11. A method for manufacturing polymer particles, comprising:
    a first step of introducing a feedstock comprising a monomer to be polymerized into a feedstock mixing device by using a feedstock feeder, and mixing the feedstock in said mixing device; and
    a second step of introducing the mixture obtained in the first step into a tubular reactor having an aspect ratio of 3,000 or more, and carrying out polymerization of said mixture in such a state that a linear speed of the mixture is maintained at 0.5 m/min or more in said reactor.

12. The method for manufacturing polymer particles according to claim 11,
    wherein dispersion polymerization of the mixture is carried out in the second step.

13. The method for manufacturing polymer particles according to claim 11, further comprising a third step of introducing the reactant obtained in the second step into the second tubular reactor, and introducing a feedstock into said second tubular reactor by using an additional feedstock feeder; and a fourth step of reacting the introduced feedstock inside the second tubular reactor.

14. The method for manufacturing polymer particles according to claim 13,
    wherein the third step comprises (1) a step of introducing a reactant and a feedstock into the mixing device; and (2) a step of introducing the mixture obtained in step (1) into the second tubular reactor.

15. The method for manufacturing polymer particles according to claim 11,
    wherein polymer particles having an average diameter of 0.1 µm to 10 µm are prepared.

16. The method for manufacturing polymer particles according to claim 11,
    wherein polymer particles having a CV value of 5 or less are prepared.

* * * * *